United States Patent
Arnold et al.

(10) Patent No.: US 7,386,750 B2
(45) Date of Patent: Jun. 10, 2008

(54) REDUCED BUS TURNAROUND TIME IN A MULTIPROCESSOR ARCHITECTURE

(75) Inventors: Barry Arnold, Fort Collins, CO (US); Mike Griffith, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 298 days.

(21) Appl. No.: 11/182,378

(22) Filed: Jul. 15, 2005

(65) Prior Publication Data

US 2007/0016706 A1 Jan. 18, 2007

(51) Int. Cl.
G06F 13/42 (2006.01)
G06F 13/36 (2006.01)
G06F 13/366 (2006.01)
G06F 13/368 (2006.01)
G06F 11/16 (2006.01)

(52) U.S. Cl. .................. 713/401; 713/400; 710/112; 710/113; 710/119; 710/305; 714/747

(58) Field of Classification Search ............... 710/112, 710/113, 242, 305, 119; 714/747; 713/400, 713/401
See application file for complete search history.

(56) References Cited

U.S. PATENT DOCUMENTS

| | | | | |
|---|---|---|---|---|
| 5,027,315 A | * | 6/1991 | Agrawal et al. | 326/38 |
| 5,230,067 A | * | 7/1993 | Buch | 710/107 |
| 5,774,700 A | * | 6/1998 | Fisch et al. | 713/500 |
| 5,911,053 A | * | 6/1999 | Pawlowski et al. | 710/307 |
| 6,170,030 B1 | * | 1/2001 | Bell | 710/310 |
| 6,209,072 B1 | | 3/2001 | MacWilliams et al. | |
| 6,336,159 B1 | * | 1/2002 | MacWilliams et al. | 713/400 |
| 6,502,154 B1 | * | 12/2002 | Meredith et al. | 710/305 |
| 6,622,256 B1 | | 9/2003 | Dabral et al. | |
| 6,785,832 B2 | | 8/2004 | Chieco et al. | |
| 6,813,724 B2 | | 11/2004 | Saito | |
| 6,832,325 B2 | | 12/2004 | Liu | |
| 2003/0226052 A1 | | 12/2003 | Hill et al. | |

OTHER PUBLICATIONS

Alper Ilkbahar, "Itanium(TM) Processor System Bus Design", IEEE Journal of Solid-State Circuits, vol. 36, No. 10, Oct. 2001, IEEE.

* cited by examiner

Primary Examiner—James K Trujillo

(57) ABSTRACT

Systems and methods of reducing bus turnaround time in a multiprocessor architecture are disclosed. An exemplary method may include mastering the system bus within one idle bus clock cycle of a bus handoff. The method may also include bypassing data from recovery latches and instead receiving data from pipeline latches into core logic, the received data mirroring data driven onto the system bus.

19 Claims, 7 Drawing Sheets

REDUCED BUS TURNAROUND TIME IN A MULTIPROCESSOR ARCHITECTURE

TECHNICAL FIELD

The described subject matter relates to multiprocessor architectures, and more particularly to systems and methods of reducing bus turnaround time in a multiprocessor architecture.

BACKGROUND

Server computers and even some personal computers (PCs) are commercially available with multiprocessing capability. A typical multiprocessor architecture may include a hub referred to as the "central agent" for handling memory transactions, input/output (I/O), etc., in addition to one or more processing units which may execute in parallel to increase overall throughput and performance of the computer system.

In a multiprocessor architecture, the central agent and processing units are typically coupled to one another for data transfer over a system bus, also referred to as a front side bus (FSB). Accordingly, the computer system's throughput and performance depends at least to some extent on the rate at which data is transferred over the system bus. During an exemplary operation, data and strobes are alternately driven onto the system bus in a quadrature phase relationship (i.e., at fixed 90 degree offsets) with respect to the bus clock. Idle bus clock cycles are imposed between each data transfer operation to allow time for the data driven to propagate to all agents attached to the bus. After one or more idle cycles on the bus, the system bus is available for use by another agent. The throughput and performance of the computer system is decreased because the frequency at which the system bus is operated is reduced to allow time for proper signaling.

DETAILED DESCRIPTION

Briefly, systems and methods described herein may be implemented in a multiprocessor architecture to reduce bus turnaround time. In an exemplary embodiment, source synchronous data is driven onto a system bus by a first processor (driving agent) and received at another processor (receiving agent). The driving agent may then release or handoff the system bus by driving both the positive (P) and negative (N) strobes high (also referred to as the P/N overlap or bus handoff). In order to reduce bus turnaround time, the receiving agent or another processor (the next driving agent) masters the system bus within one idle bus clock cycle during the P/N overlap or bus handoff.

If propagation delay on the system bus causes timing margin associated with the bus handoff to erode, the next driving agent may bypass data around its recovery latches and instead select data from its pipeline latches to supply data to its core logic. Accordingly, data is still driven onto the system bus in the correct sequence and latched into the correct registers at the other receiving agents connected to the system bus which due to their physical location relative to the driving agent are not affected by the eroded timing margins.

It is noted that operations described herein may be embodied as logic circuitry. Although exemplary logic is shown and described for purposes of illustration, it is understood that these examples are not intended to be limiting and that other embodiments will also become readily apparent to those skilled in the art after having become familiar with the teachings herein.

Exemplary System

Figure 1:
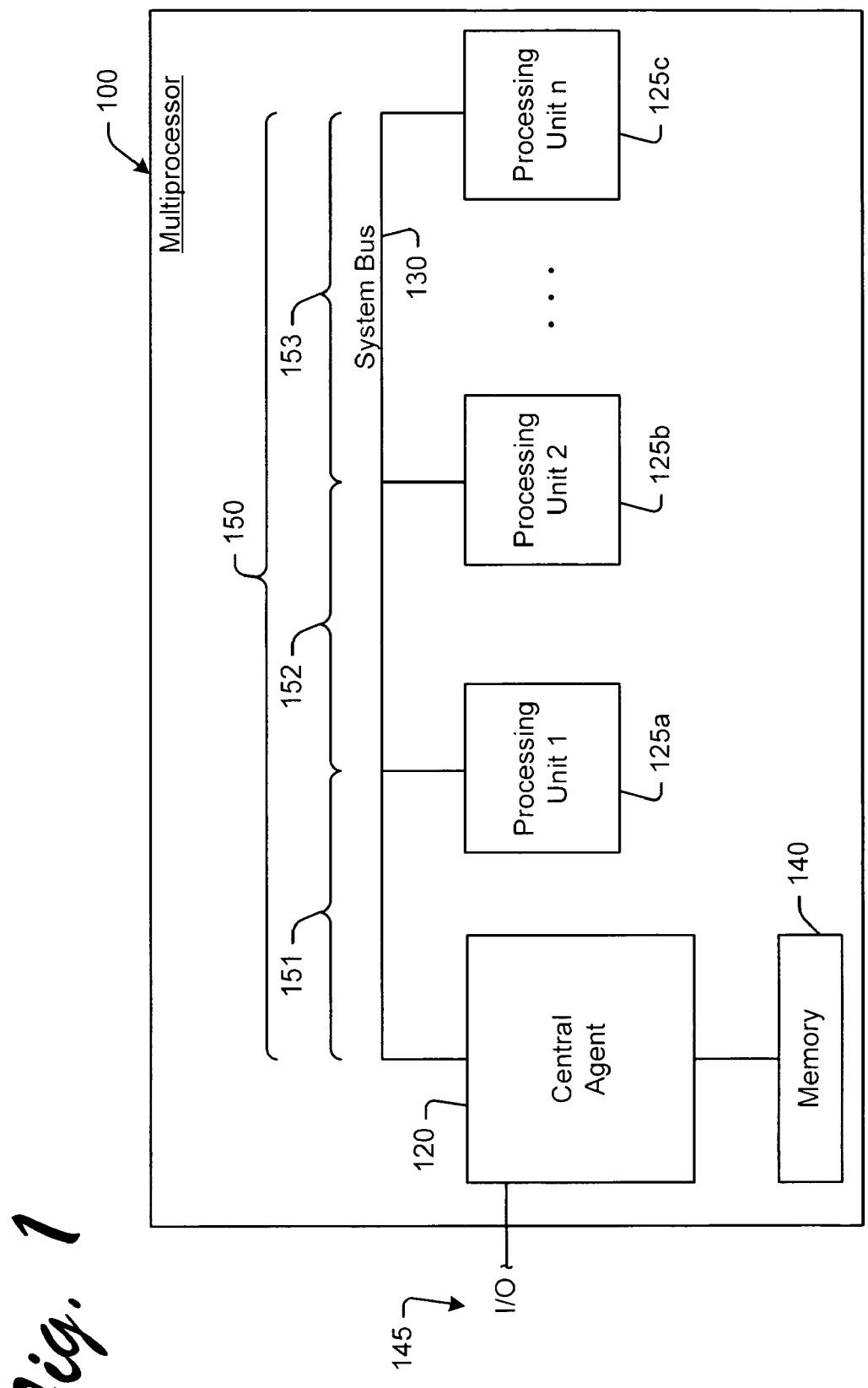
FIG. 1 is a high-level schematic illustration of an exemplary multiprocessor architecture which may implement reduced bus turnaround time.

FIG. 1 is a high-level schematic illustration of an exemplary multiprocessor architecture which may implement reduced bus turnaround time. Exemplary multiprocessor 100 may be an Intel Processor Family (IPF)-based chip, such as the ITANTUM® processor (Intel Corporation) implemented in server computers. However, it is noted that exemplary multiprocessor 100 is shown for purposes of illustration and is not intended to be limiting. Nor are multiprocessors, such as the multiprocessor 100, limited to use in server computers. Other suitable computer systems which may implement a multiprocessor architecture include, but are not limited to, personal computers (PCs), laptop computers, network workstations, electronic appliances, and other computing devices.

Exemplary multiprocessor 100 includes a hub processor or central agent 120 and a number of (i.e., one or more) processing units 125a-c. In an exemplary embodiment, the multiprocessor architecture includes one central agent and four processing units. However, multiprocessor architectures are not limited to any particular configuration.

Exemplary multiprocessor 100 may also include a system bus 130 that couples the central agent 120 and processing units 125a-c. In an exemplary embodiment, the system bus may be a front side bus (FSB). It is noted that the system bus 130 may be implemented using any of a variety of bus architectures.

Central agent 120 may serve as a memory controller, e.g., for system memory 140. System memory 140 may include various computer-readable storage media, such as read-only memory (ROM) and/or random access memory (RAM). System memory 140 stores logic instructions and/or data for access by the central agent 120 and processing units 125a-c. Generally, the central agent 120 and processing un its 125a-c are programmed by means of instructions stored at different times in the system memory 140. Central agent 120 may also serve as an input/output (I/O) controller for various I/O operations 145.

In operation, the central agent 120 and processing units 125a-c drive data onto the system bus 130 in a quadrature phase relationship (i.e., at fixed 90 degree offsets) relative to the bus clock. It is noted that the term "driving agent" is used herein to refer to any processor in a multiprocessor architecture which is sending or driving data onto the system bus 130. The term "receiving agent" is used herein to refer to any processor in a multiprocessor architecture which is receiving data from the system bus 130. Accordingly, the central agent 120 and processing units 125a-c each may be operated as a driving agent and/or a receiving agent.

Data transfer operations may incur flight time or propagation delays 150 on the system bus 140 based at least in part on the physical relation of the receiving agent and the driving agent to one another. For purposes of illustration, data transfer operations may incur a delay 151 between the central agent 120 and processing unit 125a; a delay 152 between processing unit 125a and processing unit 125b; and/or a delay 153 between processing unit 125b and processing unit 125c. Propagation delay 150 may also include any variation or combination of delays 151-153. Data transfer operations and propagation delays are discussed in more detail below with reference to the timing diagrams shown in FIGS. 2 and 3.

Figure 2:
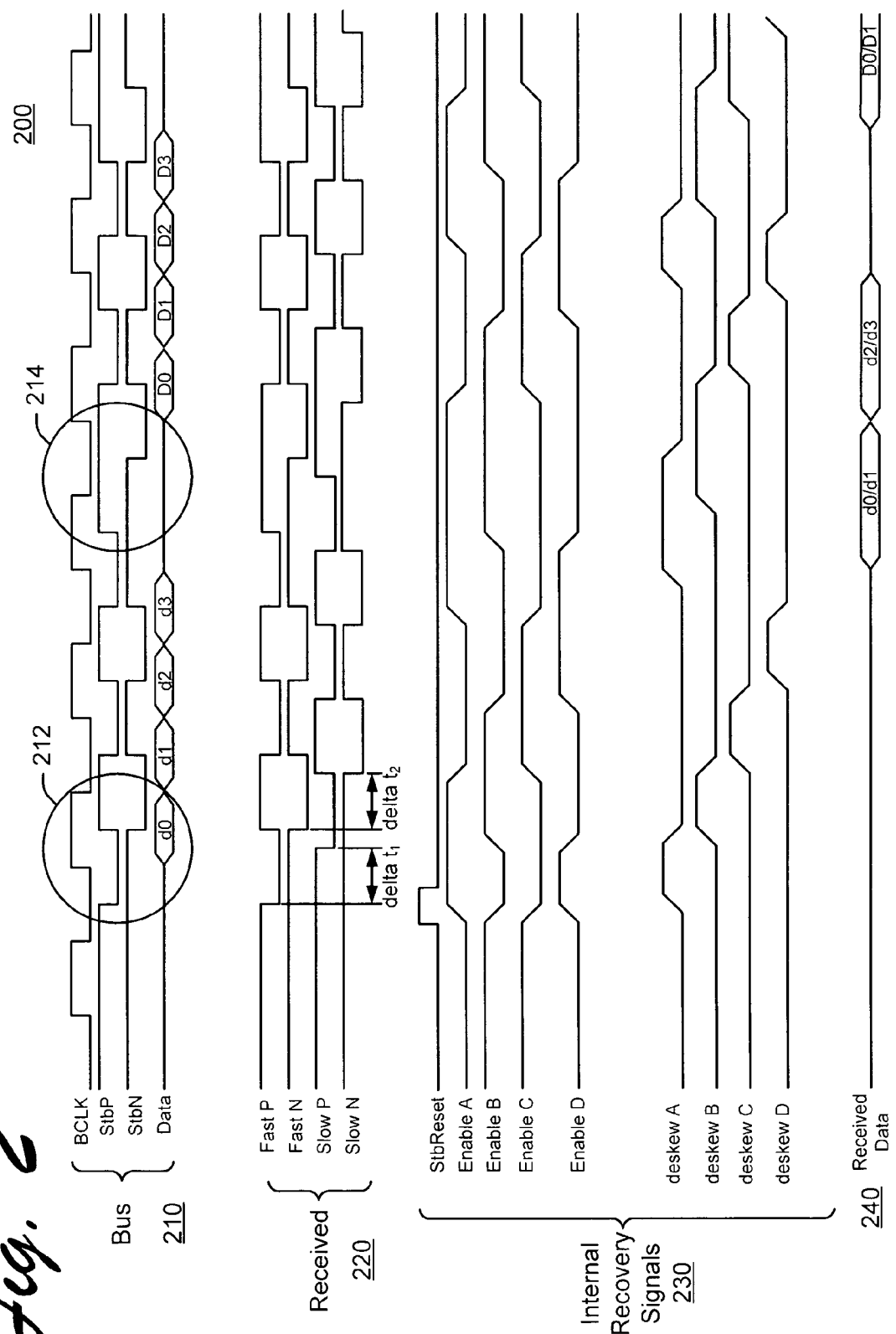
FIG. 2 is a timing diagram illustrating exemplary high frequency bus timing in a multiprocessor architecture implementing reduced bus turnaround time.

FIG. 2 is a timing diagram 200 illustrating exemplary high frequency bus timing in a multiprocessor architecture implementing reduced bus turnaround time. Exemplary timing diagram 200 includes signals 210 driven onto the system bus traces by the driving agent, corresponding signals 220 "as seen by" the receiving agents, and internal data recovery signals 230 which may be implemented at the receiving agents to latch source synchronous data in the data registers.

Source synchronous data 240 is illustrated as it may be received from the system bus (e.g., system bus 130 in FIG. 1) at the receiving agents relative to the bus clock (BCLK). During operation, two bits of received source synchronous data are supplied to the core logic of each receiving agent on each rising edge of the bus clock (BCLK). Each bus agent is required to receive all data which it drives onto the bus.

In this example, data packets d0-d3 are driven onto the system bus by a first processor as the driving agent (e.g., the central agent 120 or one of the processing units 125a-c in FIG. 1), and received by a second processor as the receiving agent (e.g., the central agent 120 or one of the processing units 125a-c in FIG. 1). The second processor then becomes a driving agent and drives data packets D0-D3 onto the system bus for the first processor or a third processor as the receiving agent (e.g., the central agent 120 or one of the processing units 125a-c in FIG. 1).

During a data transfer operation, the driving agent pre-drives either the positive (P) strobe (stbP) or the negative (N) strobe (stbN) low to master the system bus. In an exemplary embodiment, the driving agent masters the system bus by driving the P-strobe low at 270° relative to the bus clock (as shown in circle 212). The driving agent then begins driving data (e.g., data packet d0) at 0° relative to the bus clock and continues driving data (e.g., data packets d1-d3) every 180° relative to the bus clock. The P and N-strobes are differentially driven at 90° and 270° relative to the bus clock. A differential crossing of the P and N-strobes indicates that data may be latched from the bus. Although four data packets (d0-d4) are shown in FIG. 2 for purposes of simplicity, it is noted that the driving agent may drive any number of data packets onto the system bus and commonly drives up to eight data packets during each data transfer operation.

After the driving agent has driven its data onto the system bus, the N-strobe is high and the P-strobe is low. In order to release the system bus (e.g., a bus handoff), the N-strobe is held high while the P-strobe is driven high at the 90° after the rising edge of the bus clock, at which time the data drive is completed. This post drive of the P-strobe returns both strobes to their idle state (as shown in circle 214) before another source synchronous data transfer may be initiated. In general, either the P-strobe or the N-strobe is post-driven high to signal completion of a source synchronous data transfer.

To reduce bus turnaround time, another agent (now the driving agent) may drive the opposite strobe low (in this example the N-strobe) to master the bus after a single idle bus clock cycle. After mastering the bus, the driving agent drives data (e.g., data packets D0-D3) onto the system bus on alternating P and N-strobes as described above for data packets d0-d3. Driving data onto the system bus in this manner with only a single idle bus cycle on the data and with opposite strobe transitions is referred to herein as "ponging" the bus.

It is noted that data transfer operations are not limited to ponging operations. For example, if there are relatively few bus transactions, the strobes may be driven high and remain high until a subsequent driving agent masters the bus by driving the P-strobe low.

The timing diagram 200 also shows the signals 220 received at the receiving agents corresponding to the data transfer operations discussed above. Timing diagram 200 is ideal in that propagation delay along the system bus from the driving agent to the receiving agent is assumed to be zero or negligible. It is readily apparent from the timing diagram 200 that the Fast P and Fast N-strobes incur minimal delay on the system bus at the receiving agent while the Slow P and Slow N-strobes incur some delay, or "delta t" at the receiving agent (e.g., illustrated as delta $t_1$ and delta $t_2$ in FIG. 2). While the delay on Slow P and Slow N eliminates the possibility of responding to noise or glitches on the strobes, this delay may also prevent the Slow P and Slow N signals from responding to fast transitions on the strobe pads and is one of the primary paths which limit the frequency of operation of the system bus. It is noted that the term "strobe pad" as used herein refers to an electrical signal on the system bus which provides timing information for latching data at the receiving agent. The systems and methods described herein enable an agent on the system bus to circumvent this limitation and enables operating the system bus at higher frequencies for increased throughput and performance.

The timing diagram 200 also shows the internal data signals 230 at the receiving agent corresponding to the data transfer operations discussed above. Internal recovery signals 230 may include enable (A-D) and deskew (A-D) signals. The enable and deskew signals may be implemented to latch data (e.g., data packets d0-d3 and data packets D0-D3) into the correct data registers at the receiving agents, as will be described in more detail below.

Internal recovery signals 230 may also include a strobe reset (StbReset) signal. The strobe reset signal returns a state machine (not shown) at the receiving agent to a default condition when the system bus is inactive for more than one bus clock cycle. After being returned to this default condition, the receiving agent is ready to receive data on a leading P-strobe and the enable and deskew signals are in a known state so that the enable signals fire in the expected sequence to correctly latch data at the receiving agent (as illustrated by the received data 230).

Bus turnaround time is defined herein as the time between data transfer operations. That is, bus turnaround time is the time it takes a driving agent to master the bus and begin driving data (e.g., data packet D0) onto the system bus after the last data packet (e.g., d3) has been received from a previous data transfer. While the bus turnaround time is a single idle bus clock cycle, the delay associated with the Slow P and Slow N signals limits the operating frequency of the bus. In an exemplary embodiment, bus turnaround time may be reduced by driving data onto the system bus within one idle cycle of the bus clock.

It is noted, however, that the signals may incur flight-time or propagation delay and therefore may appear to some processors as being offset (by delta t) with respect to the bus clock (BCLK). This may cause data to be written to one or more incorrect registers at the receiving agent. Exemplary embodiments for reducing bus turnaround time by driving data onto the system bus within one idle cycle of the bus clock when the transactions incur propagation delay are discussed in more detail below with reference to FIG. 3.

Figure 3:
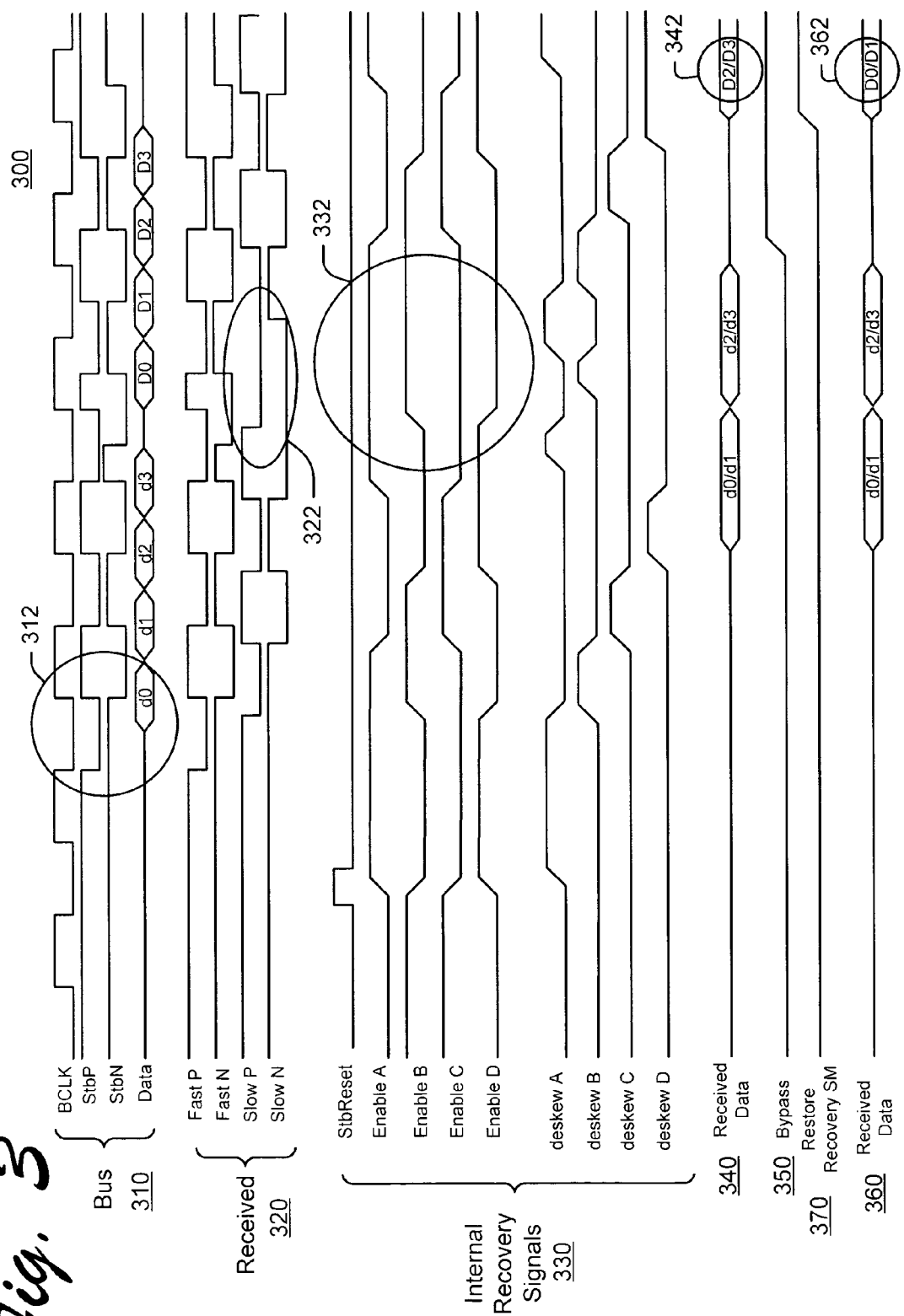
FIG. 3 is another timing diagram illustrating exemplary high frequency bus timing in a multiprocessor architecture implementing reduced bus turnaround time.

FIG. 3 is another timing diagram 300 illustrating exemplary high frequency bus timing in a multiprocessor architecture implementing reduced bus turnaround time. Exemplary timing diagram in FIG. 3 shows the effect of propagation delay which may occur on the system bus (e.g., propagation delay 150 illustrated in FIG. 1). Data and strobe transitions which are driven from a different bus agent are delayed by propagation delay 150 in FIG. 3. Data and strobe transitions which are driven local to the point of reference in FIG. 3 do not incur any propagation delay. It is noted that like 300-series reference numbers are used to refer to corresponding 200-series reference numbers in FIG. 2.

As in the example shown in FIG. 2, data packets d0-d3 are driven onto the system bus by a first processor as the driving agent (e.g., the central agent 120 or one of the processing units 125a-c in FIG. 1), and are received by a second processor as the receiving agent (e.g., the central agent 120 or one of the processing units 125a-c in FIG. 1). The second processor then becomes a driving agent and drives data packets D0-D3 onto the system bus for the first processor or a third processor as the receiving agent (e.g., the central agent 120 or one of the processing units 125a-c in FIG. 1).

As in the example shown in FIG. 2, the initial driving agent masters the system bus by driving the P-strobe low at 270° relative to the bus clock. It is noted that in FIG. 3, the timing diagram shows signals as the "signals appear" to the receiving agent relative to the bus clock (i.e., after a propagation delay). For example, the P-strobe appears to be driven low at 180° (as shown in circle 312), however, 180° is when the P-strobe appears at the receiving agent. The P-strobe was still driven at 270° relative to the bus clock (see FIG. 2). Similar propagation delay is also shown in FIG. 3 for the N-strobe and data signals.

The driving agent then begins driving data (e.g., data packet d0) at 0° relative to the bus clock and continues driving data (e.g., data packets d1-d3) every 180° relative to the bus clock. The P and N-strobes are differentially driven at 90° and 270° relative to the bus clock. The data packets, the P-strobe and the N-strobe arrive at the receiving agent with a propagation delay (e.g., delay 150 in FIG. 1) after being driven onto the system bus by the driving agent.

After the initial driving agent has finished driving its data onto the system bus, the N-strobe is high and the P-strobe is low. Although the initial driving agent releases the system bus (e.g., a bus handoff) by holding the N-strobe high while the P-strobe is driven high, the eroded P/N overlap (or eroded bus handoff) "appears" much shorter at the receiving agent. This effect of propagation delay on the signals 320 received at the receiving agents is shown in ellipse 322 (showing that the strobe pulses are filtered slow P and slow N). The effect of propagation delay may be more pronounced with greater delay (e.g., if the receiving agent is at the far end of the system bus from the driving agent), and may be less pronounced with shorter propagation delay. In exemplary operations, eroded P/N overlap (or eroded bus handoff) may cause the brief pulses on the P-Strobe and N-Strobe pads to not be propagated to the Slow-P and Slow-N signals due to low-pass noise filtering at the receiving agent.

In order to reduce bus turnaround time, the next driving agent must still drive the opposite strobe low (in this example the N-strobe) to master the bus, and then drive data (e.g., data packets D0-D3) onto the system bus on alternating P and N-strobes as described above for data packets d0-d3. However, due to the propagation delay, the brief pulses on the P-Strobe and N-Strobe pads may not be propagated to the Slow-P and Slow-N signals, causing internal recovery signals shown in circle 332 to be incorrect. This may result in the received source synchronous data being written to the incorrect registers and incorrect data being supplied to the core logic (as shown by data packets D2/D3 in circle 342).

Logic may be implemented at the next driving agent to recognize cases when the eroded P/N overlap (or eroded bus handoff) is filtered or otherwise not detected as a bus handoff. In these cases, the logic may bypass data around the recovery latches (associated with registers A-D) and instead select data from pipeline latches. An exemplary bypass signal 350 is illustrated in timing diagram 300, showing the correct data (D0/D1) is now received from the system bus (as shown in circle 362).

Logic may also be implemented at the next driving agent to restore (signal 370) a recovery state machine in the event another pong transaction follows. The restore operation resets the enable signals (A-D) to their proper condition (e.g., as illustrated in FIG. 2). Exemplary logic for implementing the bypass and restore operations is discussed in more detail below with reference to FIGS. 4-6.

Figure 4:
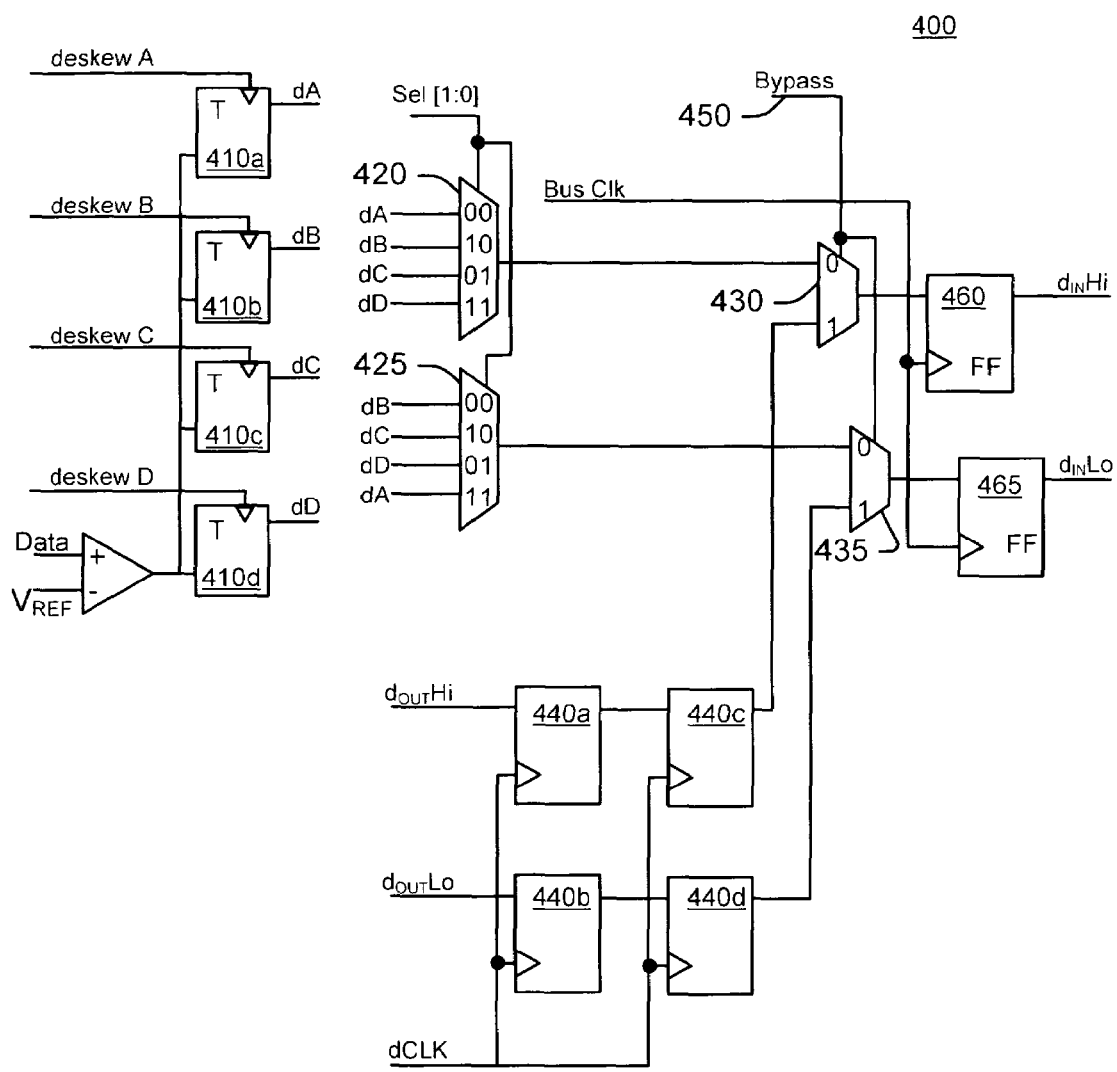
FIG. 4 is a schematic diagram illustrating an exemplary bypass circuit for implementing reduced bus turnaround time in a multiprocessor architecture.

FIG. 4 is a schematic diagram illustrating an exemplary bypass circuit 400 for implementing reduced bus turnaround time in a multiprocessor architecture. During a receive operation, data is latched into one of the recovery latches 410a-d depending on which deskew signal is set high (true). Data is held in the recovery latches 410a-d and then output by one of the two multiplexers 420, 425. For example, if data was driven on the rising edge of the bus clock, it is selected by MUX 420; if data was driven on the falling edge of the bus clock, it is selected by MUX 425. A select line (Sel[1:0]) serves as a pointer to the correct recovery latch 410a-d, i.e., it is implemented to select data from the recovery latch 410a, 410b, 410c, or 410d associated with the current transaction.

Multiplexers 430, 435 may be implemented to receive input from the recovery latches 410a-d, or alternatively, from pipeline latches 440a-d. By default, MUX 430, 435 selects data from the recovery latches 410a-d. However, if a bypass signal 450 is enabled, data is selected from the pipeline latches 440a-d and driven to the core logic (e.g., via flip flops 460, 465 at $d_{IN}$Hi and $d_{IN}$Lo). It is noted that "$d_{OUT}$" and "$d_{IN}$" is standard memory system nomenclature, wherein "$d_{OUT}$" identifies signals being issued by the core (e.g., "out of" the core), and "$d_{IN}$" identifies signals being issued to the core (e.g., "into" the core).

The $d_{OUT}$Hi and $d_{OUT}$Lo signals are also sent to the data driver. Thus the contents of pipeline latches 440a-d mirror the data driven onto the bus and what should be received in recovery latches 410a-d. By way of example data packets d0-d3 (FIG. 3) may be received at the receiving agent. Data packet d0 is latched into recovery latch 410a, data packet d1 is latched into recovery latch 410b, and so forth. During the second transaction, the prior receiving agent becomes the driving agent and drives data packets D0-D3 onto bus. During this second transaction, the "new" driving agent is required to receive the data that it drives onto the bus. Accordingly, data packet D0 should go into register dB, data packet D1 should go into register dC, and so forth. When an eroded bus handoff is detected, the bypass signal may be issued so that data in the recovery latches 410a-d is bypassed and instead data known to be correct is selected directly from the pipeline latches 440a-d.

Figure 5:
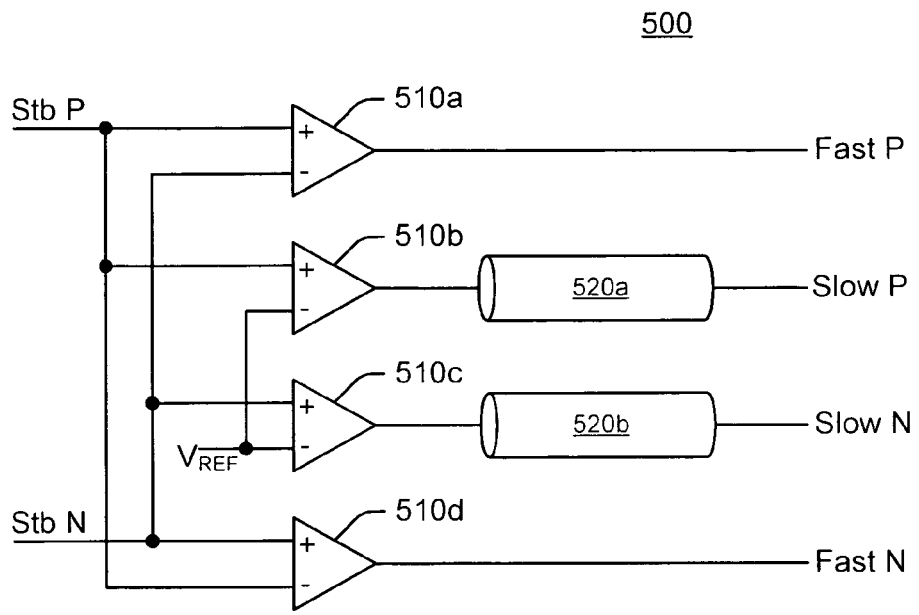
FIG. 5 is a flow path diagram illustrating an exemplary receiver circuit to reduce bus turnaround time in a multiprocessor architecture.

FIG. 5 is a flow path diagram illustrating an exemplary receiver circuit implementing reduced bus turnaround time in a multiprocessor architecture. The P and N-strobes are separated into fast and slow P-strobes, and fast and slow N-strobes by operational amplifiers (op-amps) 510a-d. The P and N-strobes may be implemented to trigger deskew signals for latching data at the receiving agent in the correct registers, as discussed in more detail below with reference to FIG. 6.

It is noted that although noise on the fast P and N-strobes may not be fatal and therefore do not need to be filtered, noise on the slow P and N-strobes may be fatal to the transaction. Accordingly, the slow P and N-strobes may be filtered using a low-pass filter 520a, 520b, respectively.

Figure 5A:
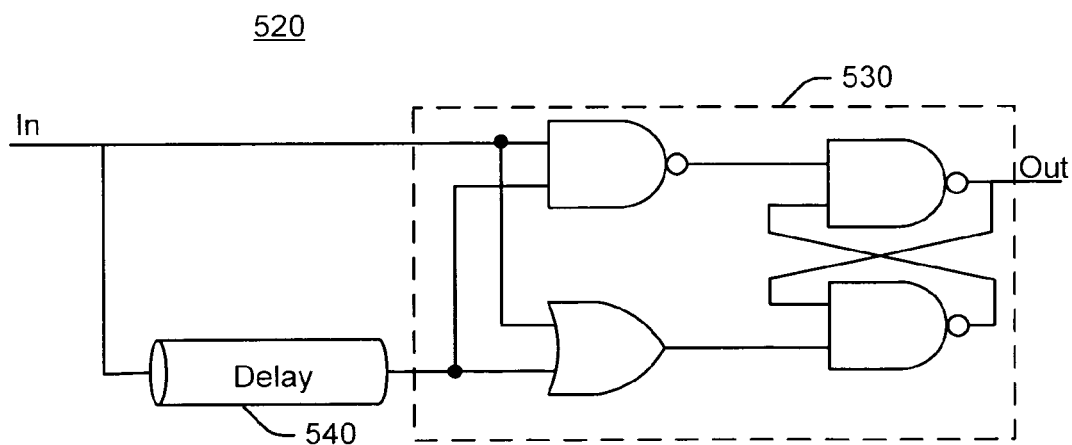
FIG. 5a is an exemplary low-pass filter circuit which may be implemented in the exemplary receiver circuit shown in FIG. 5.

FIG. 5a is a detailed flow path diagram of an exemplary low-pass filter circuit 520 corresponding to circuits 520a and 520b shown in FIG. 5. The low-pass filter circuit 520 blocks high frequency noise (or "glitches") on the input signal from reaching the output. In this exemplary embodiment, the RS flip flop 530 only toggles when the input signal and signal through delay line 540 are the same logical value (i.e., there is no noise).

Figure 6:
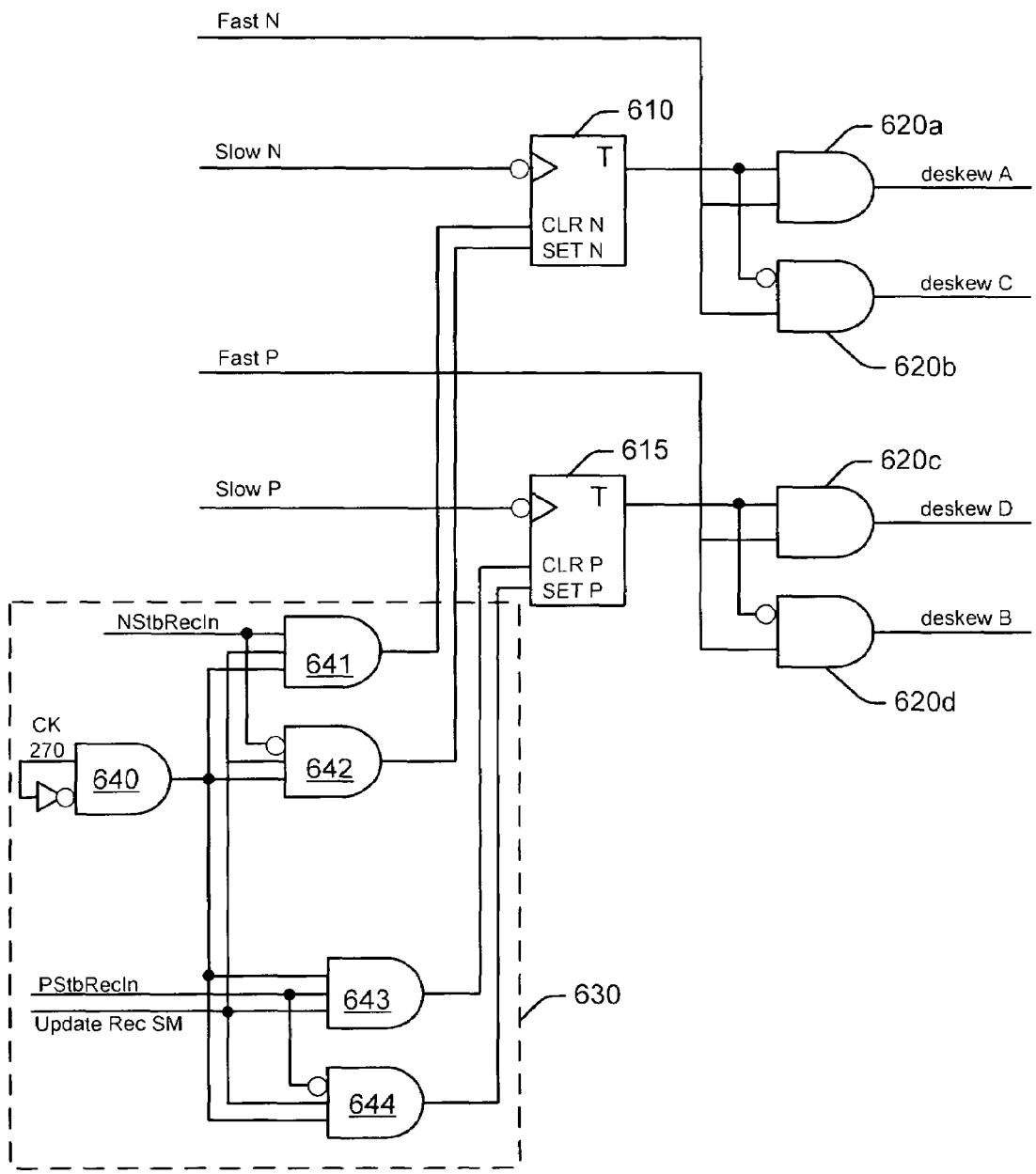
FIG. 6 is a flow path diagram illustrating an exemplary data recovery circuit to reduce bus turnaround time in a multiprocessor architecture.

FIG. 6 is a flow path diagram illustrating an exemplary data recovery circuit 600 for implementing reduced bus turnaround time in a multiprocessor. The exemplary logic in FIG. 6 illustrates convergence of the P and N-strobes to trigger the deskew clocks. Flip flops 610, 615 are clocked by the slow P and N-strobes. Output of flip flops 610, 615 toggle only on the falling edge of slow N and slow P, respectively.

For purposes of illustration, if the fast N-strobe goes low, both deskew NAND gates 620a, 620b go low. Some time later, slow N goes low, causing the state of flip flop 610 to toggle and select output from the opposite of deskew NAND gates 620a and 620b. When the fast N-strobe goes high, one of deskew NAND gates 620a or 620b fires (i.e., causing the received data to flow into either recovery register A or recovery register C). It is noted that the operation of NAND gates 620c, 620d is similar for the P-strobe.

The recovery mechanism 630 may be implemented to clear the flip flops 610, 615 independent of the clock signal. For example, output from the flip flops 610, 615 may be incorrect (thereby latching data into the incorrect registers) because the bus handoff was not recognized (e.g., it was filtered). Accordingly, recovery mechanism 630 resets the recovery state machine (flip flops 610 and 615) so that data may be correctly received in subsequent transactions.

For purposes of illustration, recovery mechanism 630 may set or clear the flip flops 610, 615 and put the recovery state machine into a state to correctly receive data in subsequent transactions. AND gate 640 implements a brief pulse at the 270° point of the bus clock cycle. The timing of this pulse at the 270° point of the bus clock cycle guarantees that both the slow P and slow N signals will be idle after the previous driving agent has driven the strobes to their idle values and before the strobes are received from the next driving agent. Accordingly, the driving agent is able to master the bus and propagate signals through the slow P (or slow N) deglitching circuitry.

An UpdateRecSm signal may be asserted on the final clock cycle on which data is to be bypassed from the pipeline latches (e.g., pipeline latches 440a-d in FIG. 4) to core logic of the chip. The NstbRecIn and PstbRecIn signals represent values to which flip flops 610, 615 are set by the recovery mechanism. The AND gates 641-644 implement logic to asynchronously set or clear flip flops 610, 615 in accordance with logical values of the bus clock pulse (BCLK_270) and logic inputs (e.g., UpdateRecSM, NstbRecIn, and PstbRecIn).

It is noted that the exemplary embodiments discussed above are provided for proposes of illustration. Still other embodiments are also contemplated.

Exemplary Operations

Figure 7:
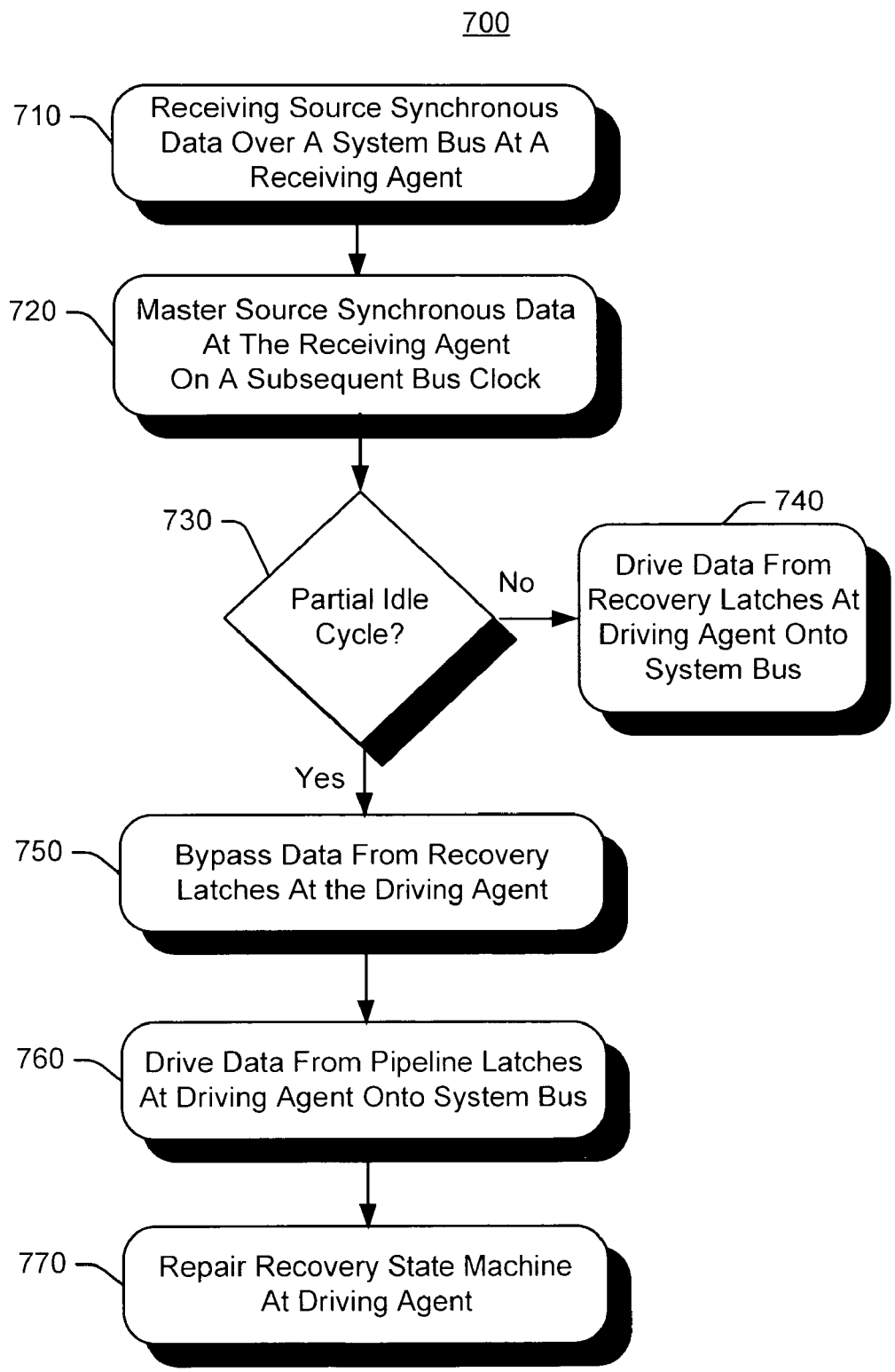
FIG. 7 is a flowchart illustrating exemplary operations to reduce bus turnaround time in a multiprocessor architecture.

FIG. 7 is a flowchart illustrating exemplary operations to implement reduced bus turnaround time in a multiprocessor. Operations 700 may be embodied in logic circuitry. In an exemplary embodiment, the components and connections depicted in the figures may be used to implement the described operations.

In operation 710 source synchronous data may be received over a system bus at a receiving agent. In operation 720, the source synchronous data is mastered at the receiving agent on a subsequent bus clock. In operation 730, a determination is made whether an idle bus cycle was issued. As discussed above, an idle bus cycle may be eroded due to propagation delay on the system bus. The eroded idle bus cycle may appear as an eroded bus handoff at the receiving agent, and may even be filtered by a low-pass filter at the receiving agent.

If a partial idle cycle is not detected, the driving agent may continue to receive data from recovery latches into its core logic in operation 740. However, if a partial idle cycle is detected, logic may be implemented in operation 750 to bypass data from the recovery latches at the new driving agent. In operation 760, received data is bypassed from the pipeline latches and forwarded to the core logic at the receiving agent. In operation 770, the recovery state machine may be reset at the driving agent so that data may be correctly received in subsequent transactions.

The operations shown and described herein are provided to illustrate exemplary implementations of reduced bus turnaround time in a multiprocessor. It is noted that the operations are not limited to the ordering shown. Still other operations may also be implemented to enhance system bus performance in a multiprocessor.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A system of reducing bus turnaround time in a multiprocessor architecture, comprising:

a system bus coupling a plurality of agents;

a driving agent on the system bus, the driving agent mastering the system bus within one idle bus clock cycle of a bus handoff by another agent;

bypass logic provided at the driving agent to bypass data from recovery latches and receive data from pipeline latches if the bus handoff is eroded due to propagation delay on the system bus.

2. The system of claim 1 further comprising recovery logic at the driving agent, the recovery logic restoring a recovery state machine at the driving agent after receiving data from the pipeline latches.

3. The system of claim 1 wherein the bypass logic is invoked if the bus handoff is not fully detected by the driving agent.

4. The system of claim 1 wherein the bypass logic is invoked if the bus handoff is filtered by the driving agent as noise on the system bus.

5. The system of claim 1 further comprising a receiving agent on the system bus, the receiving agent sequentially latching data driven onto the system bus by the driving agent.

6. The system of claim 1 wherein the driving agent drives source synchronous data onto the system bus in a quadrature phase relationship relative to a bus clock for the system bus.

7. The system of claim 1 wherein the bus handoff occurs during a P-strobe/N-strobe overlap.

8. The system of claim 1 wherein another driving agent predrives a strobe opposite a prior transaction to initiate a pong transaction.

9. The system of claim 1 wherein the driving agent masters the system bus by driving a P-strobe low.

10. A method of reducing bus turnaround time in a multiprocessor architecture, comprising:
   mastering the system bus within one idle bus clock cycle of a bus handoff;
   bypassing data from recovery latches and instead receiving data from pipeline latches into core logic, the received data mirroring data driven onto the system bus.

11. The method of claim 10 wherein bypassing only occurs if the idle bus clock cycle is eroded by propagation delay on the system bus.

12. The method of claim 10 further comprising driving data onto the system bus even if the bus handoff is filtered as noise on the system bus.

13. The method of claim 10 further comprising driving data onto the system bus even if the bus handoff is eroded.

14. The method of claim 10 further comprising correcting a recovery state machine after bypassing data from the recovery latches.

15. The method of claim 10 further comprising receiving data off of the system bus sequentially at another agent.

16. The method of claim 10 further comprising receiving data on driving data onto the system bus in a quadrature phase relationship relative to the bus clock.

17. The method of claim 10 wherein mastering the bus is on an alternating strobe.

18. A system for reducing bus turnaround time in a multiprocessor architecture, comprising:
   means for selecting data from pipeline latches;
   means for mastering a system bus within one idle bus clock cycle of a bus handoff and for receiving data selected from the pipeline latches into core logic; and
   means for bypassing data from recovery latches if the bus handoff is eroded by propagation delay on the system bus.

19. The system of claim 18 further comprising means for repairing a recovery state machine after receiving the data from the pipeline latches into core logic.

* * * * *

UNITED STATES PATENT AND TRADEMARK OFFICE
CERTIFICATE OF CORRECTION

PATENT NO. : 7,386,750 B2  
APPLICATION NO. : 11/182378  
DATED : June 10, 2008  
INVENTOR(S) : Barry Arnold et al.

It is certified that error appears in the above-identified patent and that said Letters Patent is hereby corrected as shown below:

In column 8, line 16, delete "proposes" and insert -- purposes --, therefor.

Signed and Sealed this

Twenty-third Day of September, 2008

JON W. DUDAS  
*Director of the United States Patent and Trademark Office*